Sept. 11. 1928.

W. A. MORTON 1,684,239

GLASS LEER

Filed March 14, 1925

INVENTOR.
William A. Morton
BY
W. D. Doolittle
ATTORNEY.

Sept. 11, 1928.  W. A. MORTON  1,684,239
GLASS LEER
Filed March 14, 1925  7 Sheets-Sheet 2

Sept. 11, 1928.

W. A. MORTON

1,684,239

GLASS LEER

Filed March 14, 1925

INVENTOR.
William A. Morton
BY W. G. Doolittle
ATTORNEY.

Sept. 11, 1928.  W. A. MORTON  1,684,239
GLASS LEER
Filed March 14, 1925   7 Sheets-Sheet 6

Fig. 8

INVENTOR
William A. Morton
BY
W. B. Doolittle
ATTORNEY.

Sept. 11, 1928.  
W. A. MORTON  
1,684,239

GLASS LEER

Filed March 14, 1925

INVENTOR.  
William A. Morton  
BY  
W. B. Doolittle  
ATTORNEY.

Patented Sept. 11, 1928.

1,684,239

UNITED STATES PATENT OFFICE.

WILLIAM A. MORTON, OF PITTSBURGH, PENNSYLVANIA, ASSIGNOR TO THE AMSLER-MORTON COMPANY, OF PITTSBURGH, PENNSYLVANIA, A CORPORATION OF PENNSYLVANIA.

GLASS LEER.

Application filed March 14, 1925. Serial No. 15,507. REISSUED

This invention is for an improvement in glass leers, and particularly leers of the endless conveyor type.

In annealing glassware in annealing apparatus of the class to which my invention relates, it is very desirable to introduce the ware to the annealing chamber at a temperature corresponding to the maximum temperature of the annealing chamber, and to gradually reduce the temperature of the ware from the point of introduction toward the point of discharge. Considerable difficulty has been encountered in maintaining the entrance end of the leer at a high temperature, the maximum temperature usually being attained several feet back from the entrance. In recent installations, of leers using an endless conveyor, it has been the practice in certain instances to have the muffle of the leer overhang the forward or receiving end of the conveyor, and to provide flues in the overhang through which a large portion of the gases of combustion are drawn, to thereby heat the forward end of the leer.

Even in this overhang type of leer, however, the temperature increases gradually from the entrance to a point several feet back of the entrance, but the point of maximum temperature is considerably nearer the entrance of the leer than in the old style, and the maximum temperature obtained is considerably higher.

For instance, in the old style leer, having a muffle of about fifty feet in length, the point of maximum temperature was, on the average, between twenty and thirty feet back from the entrance, and the maximum temperature obtainable was little above 500° C., while the temperature at the point of introduction was about 100° C. In the overhang type of leer, the point of maximum temperature is reached between twelve and fifteen feet back from the entrance to the muffle. The maximum temperature obtainable approaches 600° C., while the temperature at the point of entrance is between 300° and 400° C. In muffles of shorter length, approximately the same ratio of maximum temperature and distance obtains.

The present invention is for an improvement in the overhung type of leer, which enables the point of maximum temperature to be much closer to the point of entrance than in leers heretofore built and wherein the temperature of the point of entrance is very close to the point of maximum temperature a short distance back from the point of entrance.

A further object of the invention is to provide a leer having the conveyor preheated preceding its entry into the muffle, whereby heat absorption at the point of entry is materially decreased, and in some cases, entirely eliminated.

The advantages are obvious to those skilled in the art. There is, as has been proved in actual installations, a smaller percentage of breakage and a greater percentage of satisfactorily annealed articles. There is also a more efficient annealing, as shown, of course, by the reduction in breakage and increase in satisfactorily annealed ware, and there is an appreciable saving of fuel.

These and other objects and advantages are attained by the invention, which may be understood by reference to the accompanying drawings which illustrate desirable embodiments of the invention, but it will be understood that various changes and modifications are contemplated within the spirit of the invention. In the drawings:

The type of leer shown in Figs. 1 to 6 inclusive may be first described. This is the usual overhung front type of leer, such for instance as that shown in United States Patent to Walter O. Amsler No. 1,533,298 of April 14, 1925, but having my improvement applied thereto. Much of the construction of the leer thus being old, the construction of the leer broadly need be only generally referred to.

In the drawing, 5 designates the outer side walls of a leer, having an arched top 6. The bottom of the leer is designated 7. Spaced from the top, side and bottom walls of the leer inside thereof is the muffle chamber 8, having a floor or bottom 9, side walls 10, and an arched top 11, the walls of the muffle preferably being constructed in the usual manner of paneled tiles.

Between the top of the muffle and the top of the leer is a combustion space that may be divided by a transverse partition 12 into a forward chamber 13 and a rear chamber 14. The usual vertical flues 15 are provided at the sides of the muffle. In the drawings, only those flues after the first three are designated 15, the first three being designated 15$^a$, and being hereinafter more fully described.

The flues 15 open into the space 16 under the floor of the muffle, and in this space are suitably arranged baffles 17. The space 16 may be divided by a transverse wall 18, so that the hot gases will flow from the combustion chamber down some of the flues 15, circulate under the bottom of the muffle, pass up into the rear chamber 14, flow down other of the passages 15, again circulate under the muffle, to the rear of wall 18, and finally pass out of the rearmost vertical flues 15$^b$ into the main stack 19. The arrows in Fig. 2 indicate this up and down flow of gases through the several flues. This general arrangement is now incorporated in present forms of leers.

A suitable burner 20 may be provided at the top of the leer, and damper plates 21 may be provided in the several flues 15 for regulating the flow of gases through the several flues to control the temperature graduation, as will be understood by those skilled in the art.

In the front wall 5$^a$ of the leer is a feeding-in opening 5$^b$. Spaced back from the door is a shaft 22 having sprocket wheels 23 thereon over which an endless conveyor 24 passes from its return movement under the floor of the leer in the muffle chamber. Along the bottom of the muffle chamber are guide rails 25 for this conveyor, of which, for the sake of clearness, only a small portion is shown.

Figure 1:
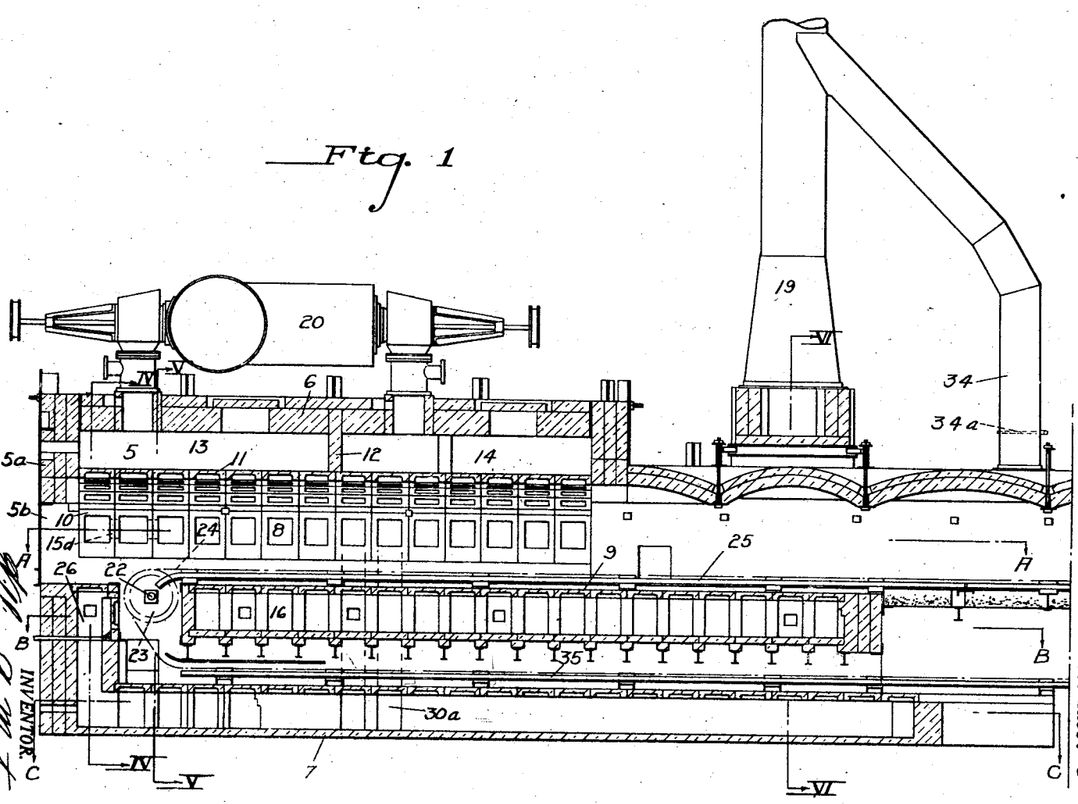
Fig. 1 is a longitudinal section through a muffle leer embodying one form of my invention.

As will be seen in Fig. 1, the front end of the leer and muffle overhangs the conveyor pulleys or wheels 23. In order to draw heat to the front part of the muffle above and forwardly of the pulleys, or entrance point of the conveyor, the first side flues, as for instance the first three side flues 15$^a$, are provided, as in said patent of Walter O. Amsler. Of these, the foremost leads into a vertical passage 26 in front of the pulleys.

Figure 2:
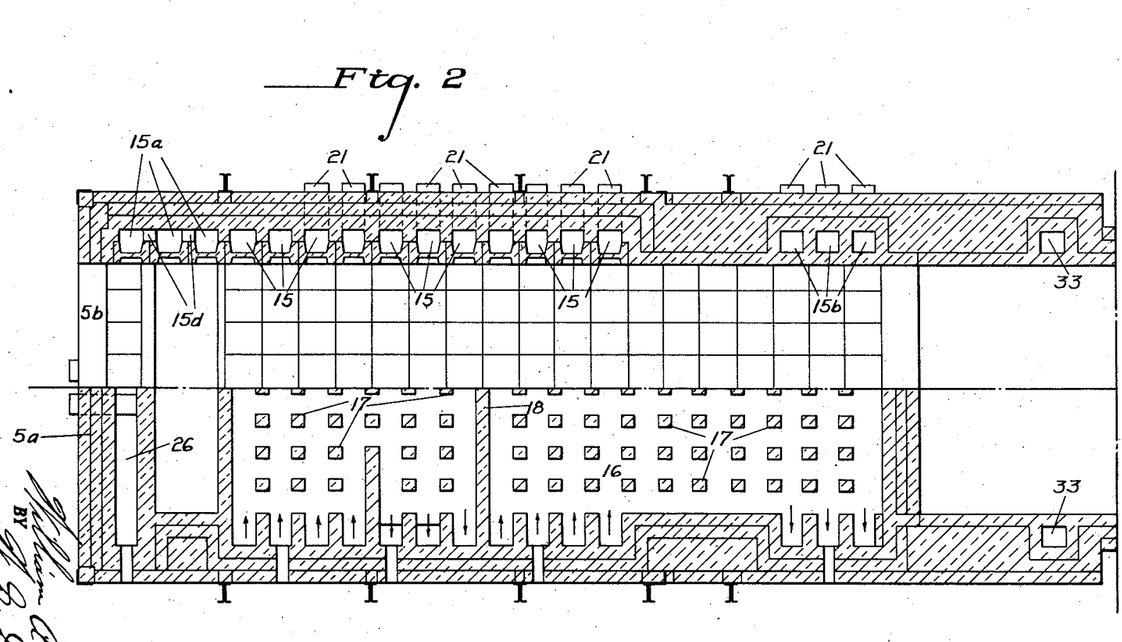
Fig. 2 is a divided horizontal section partly in the plane of line A—A of Fig. 1 and partly in the plane of line B—B of Fig. 1, the division of the sections being along the longitudinal center line of the figure.

The next two flues, in order that there may be a draft therethrough, are joined at their lower ends with an opening into the first flue, as indicated by the dotted lines at 15$^d$ in Fig. 1, and as shown in the upper part of Fig. 2. By manipulation of dampers 21, the desired amount of hot gases from the combustion chamber may be directed through these forwardmost flues to draw heat to the forward or overhung portion of the muffle.

While I have mentioned three flues, it is for the purpose of illustration merely, as the number of flues so arranged is immaterial so long as they provide for drawing some of the heat to the forward part of the leer. Furthermore, the second two flues 15$^a$ could be joined to the first flue 15, as illustrated in the said Amsler patent, rather than joining with the first flue 15$^a$, although the latter form is desirable. The point is that none of the side flues can be "blind" or "dead-ended."

Figures 3, 4:
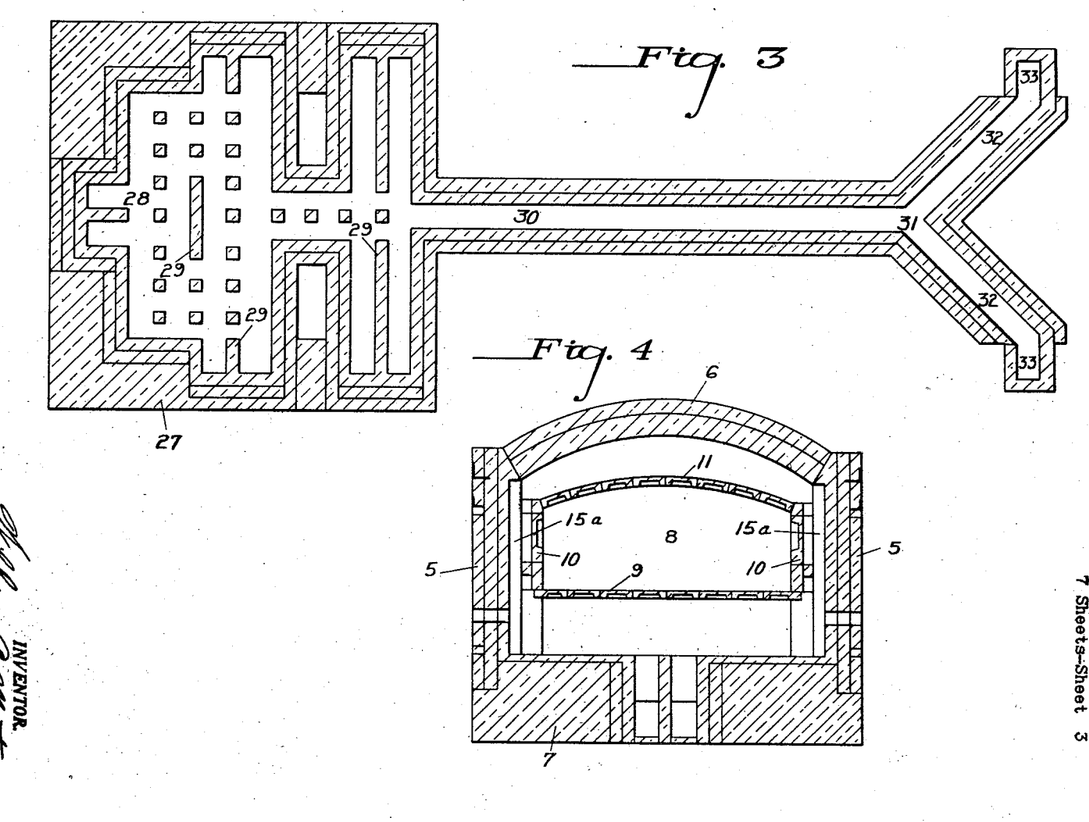
Fig. 3 is a horizontal section below the plane of section B—B on line C—C of Fig. 1.
Fig. 4 is a vertical transverse section on line IV—IV of Fig. 1.
Figure 5:
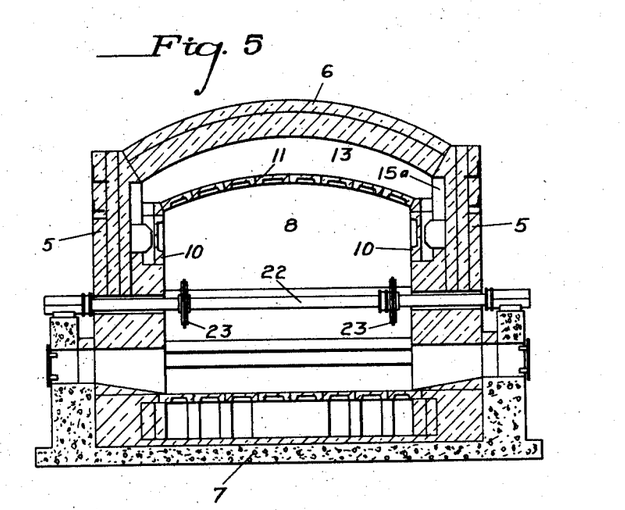
Figs. 5 and 6 are similar sections on lines V—V and VI—VI of Fig. 1, respectively.
Figure 6:
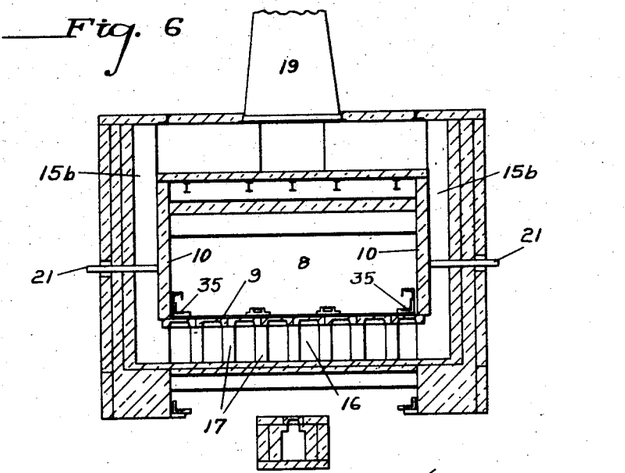
Figure 7:
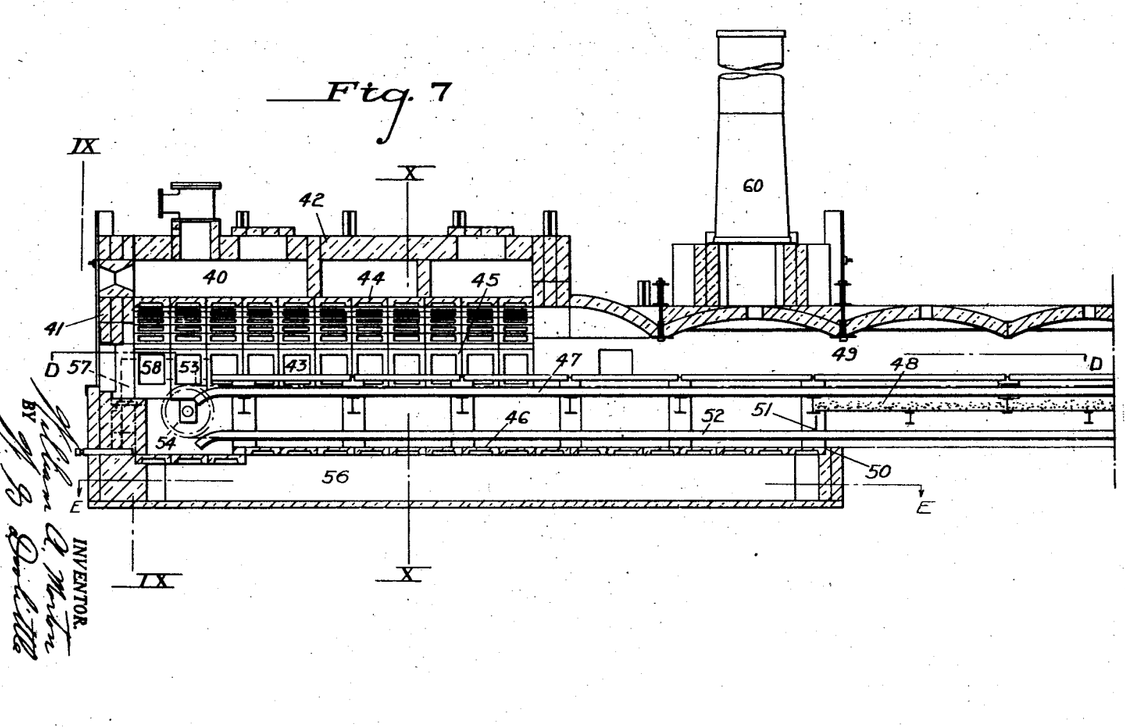
Fig. 7 is a view similar to Fig. 1 of a modified form.
Figure 8:
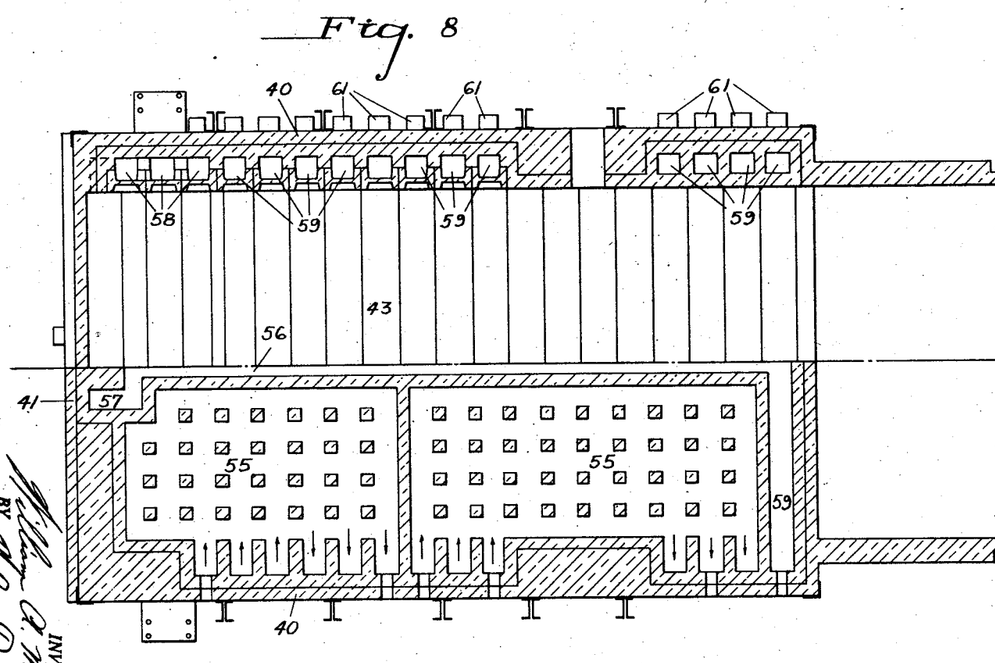
Fig. 8 is a view similar to Fig. 2, showing sections on lines D—D and E—E of Fig. 7.
Figure 9:
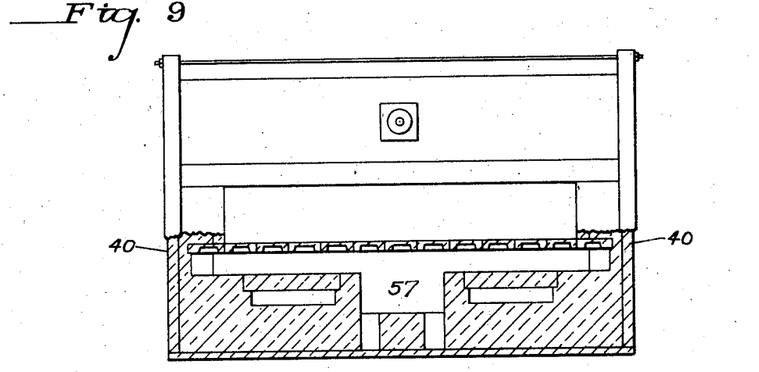
Fig. 9 is a part elevational view and a part transverse section on line IX—IX of Fig. 7.
Figure 10:
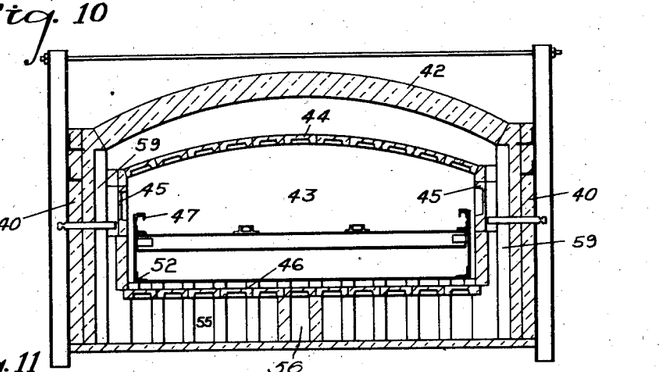
Fig. 10 is a similar section on line X—X of Fig. 7.

The vertical passage 26 narrows toward its lower end, and its lower end opens horizontally into the sub-structure 27, as shown in Fig. 3. This structure is of a refractory construction, having a chamber 28 therein in which are suitably arranged baffles 29 to insure a spreading of the gaseous flow and a wide distribution of heat. The forward part of the sub-structure is preferably about the same width as the leer. Several feet back from the entrance, it narrows down into a flue passage 30, divided at 31 into spreading passages 32 opening into vertical passages 33 going to the secondary flue 34. Provision is preferably made for closing the secondary flue 34, as indicated for instance by damper 34$^a$, so that, after the flue passages of the leer have become hot enough to establish a draft, the gases passing through the sub-structure may be directed through ports 30$^a$ leading up to and communicating with flues 15, so as to utilize all the available heat.

It will be seen that the sub-structure 27 extends under the sprocket wheels 23, and under the conveyor, several feet back from the point where it enters the leer. It is fully as wide as the conveyor, and preferably has thin tile on its upper surface, over which the conveyor rides, so as to radiate a maximum of its heat to the conveyor. Just above the top of the sub-structure are rails 35 to guide the return section of the conveyor below the bottom of the leer and above the top of the sub-structure. With this arrangement, the returning portion of the conveyor, which travels at a relatively slow speed, can be raised to approximately the temperature of the forward part of the leer. This is done, however, without sacrificing any of the heat available for heating the front end of the leer. In the said Amsler patent, the excess heat passing down the first flue is wasted, whereas in the present invention, it is utilized to its fullest extent. Not only does this arrangement heat the conveyor, but it heats the air around the conveyor, so that the air which enters the muffle around the sprocket wheels and shaft is highly preheated.

Figure 11:
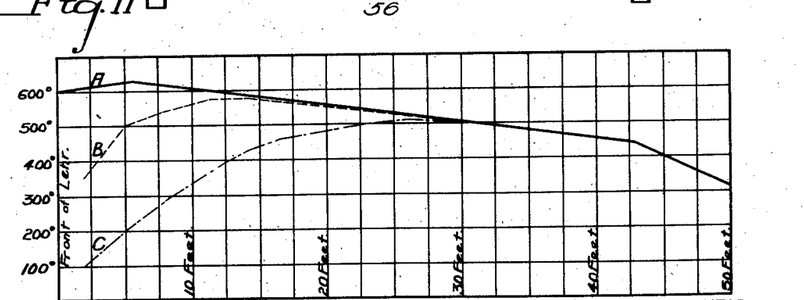
Fig. 11 is a chart showing the characteristic temperature curves for the old style leer, the overhung leer, and my improved leer, as plotted from installations now in use.

The result of the invention may be readily appreciated by referring to Fig. 11, which is a chart plotted against temperature measurements of actual leer installations of corresponding dimensions.

In the chart, which shows the temperatures of the muffle, line A is plotted against a leer of the Amsler or overhung type, modified to incorporate the present invention. The dotted line B shows the temperature curve of the usual Amsler or overhung type without the present invention. The dot-and-dash line C is the temperature curve of the usual type of endless conveyor leer without the overhung muffle chamber.

Line C indicates that at the point of entry, the temperature is about 100° C., and it increases quite gradually back from the entrance until the maximum of about 510° C. is reached, about twenty-six feet back in the fifty-foot muffle. Line B shows that the temperature at the entrance point is considerably higher in the overhung type of leer, it being about 350° C. The maximum temperature of about 575° C. is rather gradually approached between eleven and thirteen feet back from the entrance. Line A shows the temperature at the entrance to be above 600° C., and that there is an increase from this point of only about 20° C., this maximum temperature point being less than six feet from the entrance.

Curve A approaches a practically ideal condition for annealing glassware, and in practice, it has been found that the leer reduces breakage to a percentage far below any heretofore obtainable. The conditions are also ideally suitable for heat-resistant ware of the well known Pyrex type, and all heavy poorly distributed glasses.

In the construction shown in Figs. 7 to 10 inclusive, I have followed the same general idea adapted to a leer wherein the return of the conveyor travels partway through the muffle chamber to thereby become preheated.

In these figures, 40 designates the side walls, 41 the front wall, and 42 the top of a leer construction. The muffle chamber is designated 43, and it has a top wall or roof 44, side walls 45, and a bottom 46, which is considerably lower than the muffle bottom in the Fig. 1 construction. This bottom 46 is dropped below the level of the upper conveyor guides 47 and below the bottom 48 of the annealing tunnel 49. Bottom 46 is extended at 50 under the bottom of the tunnel, and it is through the space or opening 51 that the return of the conveyor enters the muffle, lower guides for this conveyor being shown at 52. The conveyor is designated 53. Near the forward end of the muffle are sprockets 54 around which the conveyor passes.

The muffle chamber is spaced from the walls of the leer, so as to provide the combustion chamber and side flues as hereinbefore described in connection with Figs. 1 to 6 inclusive. Under the muffle are heating chambers 55, through which the gases of combustion circulate through side flues in the manner hereinbefore described. This heating chamber 55 has a longitudinal passage 56 therein which is separate and distinct from the remaining space under the floor of the muffle.

At its forward end, passage 56 communicates with vertical passage 57 in the front wall 41. Passage 57 communicates with side flues 58 at the forward end of the muffle, and it is through these side flues that heat is drawn to the forward part of the muffle chamber, as explained in connection with the leer of the type shown in Fig. 1. The rear of passage 56 terminates in spreading flues 59ª that lead to the chimney 60. Only the first few of the side flues 58 communicate with passage 57. The other side flues 59 communicate with the heating chambers 55, as above mentioned. The last series of side flues 59 also lead to chimney 60. The arrows in Fig. 8 indicate the general up and down flow of gases With this arrangement, the gases of combustion that heat the front of the muffle through the side flues 58 serve to heat the center of the bottom of the muffle chamber. The advantage of the separate passage 56 is to obtain a better control of the flow of hot gases to the several parts of the leer. This control of gas flow can further be regulated by the provision of the usual dampers 61.

In this construction, the return portion of the conveyor enters the muffle well back of the forward portion of the leer and is gradually preheated until it is at the temperature of the muffle when it reaches a position to receive the ware. As it is desirable to gradually reduce the heat from the front of the leer back, the conveyor, entering the cooler end of the leer, assists, by its absorption of heat, in maintaining this condition. The return portion of the conveyor, furthermore, moves close to the bottom of the muffle, and is heated to a very high temperature, and the gases that are used in heating the forward end of the muffle assist in heating the conveyor.

From the foregoing, it will be seen that I have, by preheating the conveyor before bringing it into the top of the forward end of the muffle, made a remarkable improvement in leers, and have done this without greatly adding to the cost of the construction. The invention utilizes heat that has heretofore been wasted, so that, besides giving greatly improved annealing conditions and attaining higher maximum temperatures, it effects a saving of fuel, in that more of the available heat is delivered to the muffle.

What I claim is:

1. In a glass leer of the muffle type having an endless conveyor for carrying wares therethrough, and in which the muffle overhangs the forward end of the conveyor, said leer having passages for the circulation of gases around the sides and under the bottom of the muffle, other passages at the sides of the forward end of the muffle for heating the portion of the muffle overhanging and in advance of the conveyor, and a surface over and in close proximity to which the forward end of the return portion of the conveyor moves, and a circulating passage under said surface through which gases passing through the said passages at the forward end of the muffle flow to heat the conveyor.

2. In a glass leer, a muffle, a conveyor having a portion extending through the muffle and a return portion below the muffle, the forward end of the conveyor entering the muffle a short distance back from the forward end of the muffle whereby the muffle overhangs the forward end of the conveyor, gas circulating chambers above and below the muffle and flues at the sides of the muffle connecting the upper and lower chambers, a separate flue at the sides of the portion of the muffle overhanging the conveyor, and a sub-structure extending under the forward end of the return portion of the conveyor and below the muffle, and of substantially the same width as the conveyor, said sub-structure having a circulating chamber therein with which the said separate flues for heating the overhung portion of the muffle communicate, said sub-structure constituting a heating means for the conveyor.

3. In a muffle leer, of the type having an endless conveyor with the muffle passage overhanging the point where the returning portion of the conveyor enters the muffle, separate passages at the sides of the muffle for heating that portion of the muffle which extends in advance of the conveyor and that portion of the muffle through which the conveyor passes, and a sub-structure under the conveyor having a circulating chamber therein heated from gases leaving those flues that heat the sides of the muffle in advance of the conveyor for heating said conveyor immediately in advance of where it enters the muffle.

4. In a leer of the muffle type having an endless conveyor with a portion extending through the muffle and a return portion below the muffle, said return portion entering the muffle back from the forward end thereof so that the forward portion of the muffle overhangs the conveyor, an upper combustion and circulating chamber above the muffle, a lower chamber under the muffle and to the rear of the entrance point of the conveyor, a conveyor heating means under and in close proximity to the return portion of the conveyor at its point of entry into the muffle. flues around the overhung portion of the muffle leading from said upper chamber to the conveyor heating means, and flues at the sides of the muffle rearwardly of the point where the conveyor enters the muffle connecting the upper chamber with the chamber below the muffle.

5. In a muffle leer having an endless conveyor passing through the muffle thereof and of the type in which the muffle extends forwardly beyond the forward end of the conveyor, gas circulating passages around the forward part of the muffle in advance of the forward end of the conveyor, other gas circulating passages around the sides of the muffle back from the forward end of the conveyor, and means utilizing gases passing through said first mentioned circulating flue for heating the return portion of the conveyor, said means including passages disposed under the forward end of the conveyor and in communication with the said gas circulating passages at the forward part of the muffle.

6. In a glass leer, a muffle, a conveyor having a portion extending through the muffle with the forward end of the conveyor entering the muffle a short distance back from the forward end of the muffle, whereby the muffle overhangs the forward end of the conveyor, gas circulating chambers above and below the muffle, flues at the sides of the muffle connecting the upper and lower chambers, a sub-structure under the conveyor having a relatively wide circulating chamber at the forward end of the sub-structure, a passage leading from the wide circulating chamber through the sub-structure, a chimney, and a valve-controlled flue in communication with the last mentioned passage and the chimney.

7. In a glass leer, a muffle, a conveyor having a portion extending through the muffle with the forward end of the conveyor entering the muffle a short distance back from the forward end of the muffle, whereby the muffle overhangs the forward end of the conveyor, gas circulating chambers above and below the muffle, flues at the sides of the muffle connecting the upper and lower chambers, a sub-structure under the conveyor having a relatively wide circulating chamber at the forward end of the sub-structure, an extended floor portion projecting inwardly from the muffle, a chimney, a passage under the extended floor in communication with the relatively wide passage of the sub-structure, and a valve-controlled flue in communication with the passage under the floor and the chimney.

In testimony whereof I affix my signature.

WILLIAM A. MORTON.